United States Patent Office 3,066,111
Patented Nov. 27, 1962

3,066,111
VINYL CHLORIDE POLYMERS PLASTICIZED WITH MORPHOLIDES OF THE FATTY ACID CONSTITUENT OF COTTONSEED OIL
Frank C. Magne, Evald L. Skau, and Robert R. Mod, New Orleans, La., assignors to the United States of America as represented by the Secretary of Agriculture
No Drawing. Filed Dec. 29, 1960, Ser. No. 79,470
4 Claims. (Cl. 260—30.4)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This application is a continuation-in-part of application Serial No. 770,565, filed October 29, 1958.

This invention relates to unique mixed morpholides. More particularly, this invention provides mixed morpholides which are good primary solvent plasticizers for vinyl chloride resins, and which are plasticizers that can be economically produced from cottonseed oil.

By the terms "selective hydrogenation" and "selectively hydrogenated" used throughout this specification and the accompanying claims, we mean a controlled catalytic hydrogenation carried out under conditions which are known to allow the selective addition of hydrogen to unsaturated carbon to carbon linkages. Selective hydrogenation in the instant case yields a product, in which, as is more fully described below, polyunsaturates have been reduced to monounsaturates without any substantial concurrent reduction of monounsaturates to saturates.

The mixed morpholides provided by this invention comprise the morpholides of mixed saturated and unsaturated fatty acids which mixture of acids can be obtained from selectively hydrogenated cottonseed oil.

A morpholide of an acid is an amide of the acid in which the amido nitrogen atom is a nitrogen atom of a morpholine ring. Prior workers have produced the morpholides and other amides of various individual fatty acids and mixtures of fatty acids. Many of the fatty acid amides heretofore produced, e.g., those disclosed in U.S. Patents 1,986,854; 2,339,056; and 2,380,925 are solvent plasticizers for hydrophilic vinyl resins, such as the polyvinyl acetal resins.

A compound which is a solvent plasticizer for, and thus is compatible with, a hydrophilic vinyl resin such as a polyvinyl acetal resin, exhibits only a very limited compatibility with a hydrophobic vinyl resin such as polyvinyl chloride. If a resin is plasticized with a compound with which it has only a limited compatibility the plasticizer soon exudes or migrates to the surface unless the plasticizer is used in limited amount, or is used as a secondary plasticizer; i.e., diluted with a highly compatible plasticizer, to obtain adequate compatibility.

As might be expected from the known compatibility of various morpholides of fatty acids with the polyvinyl acetals, the morpholide mixtures from glyceride oil acids such as cottonseed oil acids are incompatible with polymers of vinyl chloride, even when used as a secondary plasticizer with an equal amount of a highly compatible plasticizer. However, we have discovered that the unique mixture of saturated and unsaturated fatty acid morpholides defined below exhibits good compatibility with vinyl chloride resins. The term "vinyl chloride resins" is used throughout the specification and claims to refer to polymers and copolymers of monomers containing vinyl chloride in a predominant proportion in parts by weight. Terms such as "good compatibility," "compatible," and "compatible plasticizers" in reference to plasticizers for vinyl chloride resins are used throughout the specification to refer to plasticizers which show no signs of exudation or migration to the surface for at least 130 days when the plasticizer is present in the proportion of 80 parts per 100 parts by weight of vinyl chloride resin.

The primary object of the present invention is to provide mixed morpholides which are good primary solvent plasticizers for vinyl chloride resins, and which are plasticizers that can economically be produced from cottonseed oil fatty acids.

The mixed morpholides provided by this invention comprise, the morpholides of mixed saturated and unsaturated fatty acids which mixture of acids can be obtained from selectively hydrogenated cottonseed oil and in which mixtures of acids, the weight proportions of saturated acids (S), monoolefinic acids (M), and polyolefinic acids (P) are such that (S) does not differ substantially from (S) of the mixture of acids from unhydrogenated cottonseed oil and $$\frac{P}{M+P}$$

is less than about 1/10.

In U.S. Patent No. 2,863,845, a copending application with continuation-in-part, Serial No. 770,565, filed October 29, 1958 (now abandoned), of which latter the instant application is, in turn, a continuation-in-part, it was disclosed that the morpholides of a mixture of saturated and unsaturated fatty acids in which mixtures of acids the weight proportions are such that $$\frac{S}{S+M+P}$$

is from about $$\frac{1 \text{ to } 9}{100}$$

and $$\frac{P}{M+P}$$

is less than about 1/10 are good compatible plasticizers for vinyl chloride resins.

The morpholides of cottonseed fatty acids from the naturally occurring cottonseed oil comprise the morpholides of a mixture of saturated, monounsaturated, and polyunsaturated acids, in which mixture of acids the weight proportions are such that $$\frac{S}{S+M+P}$$

is about 25/100 and $$\frac{P}{M+P}$$

is about 65/100. These are typical values:

$$\frac{S}{S+M+P}$$

for example, can vary from a value of about 23/100 to 28/100 in naturally occurring cottonseed oils. The saturated fatty acids present in said mixture of acids consist almost entirely of stearic and palmitic acids, and the monounsaturated and polyunsaturated acids consist almost entirely of oleic and linoleic acids, respectively.

The morpholide of palmitic acid and the morpholide of stearic acid were evaluated as plasticizers for vinyl chloride resin and each was found to be highly incompatible, exhibiting migration to the surface within 36 hours. Synthetic morpholide mixtures containing various proportions of the morpholides of stearic, oleic, and linoleic acids were also evaluated as plasticizers for vinyl chloride resin. Of these morpholide mixtures, all those containing a proportion of saturated, monounsaturated, and polyunsaturated acyls such that the mixture of acyls was equivalent to a mixture of acids in which $$\frac{S}{S+M+P}$$

was greater than about 9/100 or $$\frac{P}{M+P}$$

was greater than about 1/10 were incompatible with the vinyl chloride resin as per U.S. No. 2,863,845. For example, a series of six synthetic mixtures prepared from the morpholides of oleic, linoleic, and stearic acids wherein the fraction $$\frac{P}{M+P}$$

in all cases was less than about 1/10 but the fraction $$\frac{S}{S+M+P}$$

was varied between the limits 17.9/100 and 30.5/100 (namely, 17.9/100, 19.1/100, 23.8/100, 23.9/100, 28.6/100, and 30.5/100) proved incompatible with vinyl chloride resins as evidenced by the visual separation of plasticizer and resin. On the other hand, those in which the proportion of acyls was equivalent to a mixture of acids in which $$\frac{S}{S+M+P}$$

was less than about 9/100 and $$\frac{P}{M+P}$$

was less than about 1/10 were compatible with vinyl chloride resin.

We have discovered that the morpholide of the mixture of fatty acids obtained from selectively hydrogenated cottonseed oil is a good compatible plasticizer for vinyl chloride resins. This is surprising since this morpholide mixture contains a proportion of saturated, monounsaturated, and polyunsaturated acyls such that the acyls are equivalent to a mixture of acids in which $$\frac{S}{S+M+P}$$

is about 25/100.

This mixed morpholide plasticizer differs from and is prepared more easily and economically than that obtained from cottonseed oil by the process described in U.S. No. 2,863,845, a copending application with continuation-in-part, Serial No. 770,565, filed October 29, 1958, of which latter the instant application is, in turn, a continuation-in-part. The patent requires an additional step in its preparation; namely, fractionation to reduce the proportion of the morpholides of the saturated acyls in the mixture.

While the mixed morpholides provided by this invention can be produced in a variety of ways, they are preferably produced by reacting the mixed acids with morpholine, and, the mixed acids are preferably produced by saponifying a selectively hydrogenated cottonseed oil and acidifying the resulting salts with a mineral acid.

The mixture of saturated and unsaturated fatty acids in naturally occurring cottonseed oil, contains a proportion of saturated, monounsaturated, and polyolefinic acyls such that the mixture of acyls is equivalent to a mixture of acids in which $$\frac{S}{S+M+P}$$

is about 25/100 and $$\frac{P}{M+P}$$

is about 65/100. The proportion of polyolefinic acyls can be reduced by selectively hydrogenating the polyolefinic acyls contained in cottonseed oil; in cottonseed fatty acids; or in the mixed morpholides of cottonseed fatty acids. The usual procedure and apparatus for selectively hydrogenating oils can be employed. The extent of reaction can be followed by the usual control methods such as periodical determinations of the iodine value, thiocyanogen value, and/or amount of reactants converted. Where such materials are hydrogenated, the reaction should be terminated before a substantial proportion of monoolefinic acyls react. Regardless of whether the selective hydrogenation is applied to the cottonseed oil, to the free cottonseed acids or to the mixed morpholides of the cottonseed acids, hydrogenation of the polyunsaturated acyls should be terminated before enough monoolefinic acyls react to produce a mixture of acyls equivalent to a mixture of acids in which (S) is substantially different from (S) of the mixture of acids obtained from the unhydrogenated cottonseed oil.

If a portion of the saturated acyls was removed from the cottonseed oil before the cottonseed oil was subjected to the process herein disclosed, the resulting mixed morpholides would likewise be compatible plasticizers for vinyl resins.

The mixed morpholides provided by this invention can be produced from cottonseed oil by a number of different methods; for example, (1) by selective hydrogenation of cottonseed oil, saponification and subsequent acidulation to obtain the fatty acid mixture, and reaction of the fatty acid mixture with morpholine; (2) by saponification and subsequent acidulation of the cottonseed oil, selective hydrogenation of the resulting fatty acid mixture, and reaction of the hydrogenated acid mixture with morpholine; and (3) by saponification and subsequent acidulation of the cottonseed oil, reaction of the resulting mixture of acids to form a morpholide mixture, and selective hydrogenation of the morpholide mixture. The conversion of the acids to morpholides, in each instance, can be accomplished by reacting with morpholine by any of the usual procedures for reacting mixed acids with morpholine to produce the corresponding mixed morpholides.

The mixed morpholides provided by this invention are efficient primary plasticizers for, and exhibit good compatibility with, polymers and copolymers of monomers predominating in vinyl chloride, such as polyvinyl chloride, and the vinyl chloride-vinyl acetate copolymers predominating in vinyl chloride. They can be employed as primary plasticizers in proportions of from about 10 to at least 80 parts by weight per 100 parts by weight of polymer.

The following example is illustrative of at least one method of practicing the invention.

Example 1

A refined cottonseed oil was subjected to a selective hydrogenation, using hydrogen under 2 to 3 p.s.i. pressure, in the presence of 0.5% nickel as a catalyst at 400° F., to convert the polyolefinic acyls to monoolefinic acyls. The hydrogenated oil had an iodine value of 69.1 and a thiocyanogen value of 65.0, indicating that the proportion of acyls in the hydrogenated oil was equivalent to a mixture of acids in which $$\frac{S}{S+M+P}$$

was about 25/100 and $$\frac{P}{M+P}$$

was about 7.3/100. The hydrogenated oil was saponified with aqueous sodium hydroxide and the fatty acids were obtained by adding an excess of hydrochloric acid and washing with water. This fatty acid mixture was then mixed with an excess of morpholine and a small amount of benzene and refluxed until no more water was evolved. The reaction product contained about 6% of unreacted fatty acid, which was removed by dissolving the reaction product in carbon tetrachloride and extracting successively with small portions of 4% alcoholic potassium hydroxide, splitting into two layers each time by adding water. After washing and stripping, the morpholide mixture was filtered. The final product contained about 0.2% of free fatty acid.

This morpholide mixture was compared with di-2-ethylhexyl phthalate, "DOP," as the plasticizer in a standard formulation, comprising: 63.5% of a vinyl chloride-vinyl acetate (95–5) copolymer, 35% plasticizer, 0.5% stearic acid, and 1.0% basic lead carbonate. The results were as follows:

| Plasticizer | Compatibility | Tensile Strength, p.s.i. | 100% Modulus, p.s.i. | Elongation, percent | Brittle Point, °C. |
|---|---|---|---|---|---|
| Mixed morpholides of Example 1. | Good | 2,790 | 1,400 | 320 | −43 |
| DOP | Good | 2,990 | 1,640 | 300 | −33 |

The compatibility of both plasticizers is considered to be permanent since neither showed signs of exudation or of migration to the surface even after 130 days.

We claim:

1. A plastic composition which is stable against exudation of plasticizer comprising a mixture containing a vinyl chloride polymer selected from the group consisting of polyvinyl chloride and a vinyl chloride-vinyl acetate copolymer which contains a predominant amount of vinyl chloride, and a plasticizer therefor comprising a morpholide mixture of morpholides of selectively hydrogenated cottonseed oil fatty acids, the selective hydrogenation being performed under conditions which result in reducing the proportion of polyolefinic acyls in the mixture by converting the polyolefinic acyls to monoolefinic acyls without substantially increasing the proportion of saturated acyls in the mixture, said morpholide mixture consisting of the morpholides of monoolefinic fatty acids (M), polyolefinic fatty acids (P), and saturated fatty acids (S), said saturated fatty acids (S) being present in the amounts naturally occurring in cottonseed oil, and in which morpholide mixture the proportion of the polyolefinic fatty acyls based on the total unsaturated acyls is such that $$\frac{P}{M+P}$$

is less than 1/10 by weight.

2. A plastic composition which is stable against exudation of plasticizer comprising a mixture containing a vinyl chloride polymer selected from the group consisting of polyvinyl chloride and a vinyl chloride-vinyl acetate copolymer which contains a predominant amount of vinyl chloride, and a plasticizer therefor comprising a morpholide mixture of morpholides of cottonseed oil fatty acids obtained from cottonseed oil selectively hydrogenated to reduce polyolefinic acyls to monoolefinic acyls, said morpholide mixture consisting of the morpholides of monoolefinic fatty acids (M), polyolefinic fatty acids (P) and saturated fatty acids (S), said saturated fatty acids (S) being present in the amount naturally occurring in said cottonseed oil prior to its selective hydrogenation, and in which morpholide mixture the weight proportion of $$\frac{P}{M+P}$$

is less than 1/10.

3. A plastic composition which is stable against exudation of plasticizer comprising a mixture containing a vinyl chloride polymer selected from the group consisting of polyvinyl chloride and a vinyl chloride-vinyl acetate copolymer which contains a predominant amount of vinyl chloride, and a plasticizer therefor comprising a morpholide mixture of morpholides of selectively hydrogenated cottonseed oil fatty acids, the selective hydrogenation being performed under conditions which result in reducing the proportion of polyolefinic acyls in the mixture by converting the polyolefinic acyls to monoolefinic acyls without substantially increasing the proportion of saturated acyls in the mixture, said morpholide mixture consisting of the morpholides of monoolefinic fatty acids (M), polyolefinic fatty acids (P), and saturated fatty acids (S), said saturated fatty acids (S) being present in an amount ranging from about 23/100 to 28/100, and in which morpholide mixture the proportion of the polyolefinic fatty acyls based on the total unsaturated acyls is such that $$\frac{P}{M+P}$$

is less than 1/10 by weight.

4. A plastic composition which is stable against exudation of plasticizer comprising a mixture containing a vinyl chloride polymer selected from the group consisting of polyvinyl chloride and a vinyl chloride-vinyl acetate copolymer which contains a predominant amount of vinyl chloride, and a plasticizer therefor comprising a morpholide mixture of morpholides of cottonseed oil fatty acids obtained from cottonseed oil selectively hydrogenated to reduce polyolefinic acyls to monoolefinic acyls, said morpholide mixture consisting of the morpholides of monoolefinic fatty acids (M), polyolefinic fatty acids (P) and saturated fatty acids (S), and in which morpholide mixture the weight proportion of $$\frac{P}{M+P}$$

is less than 1/10 and $$\frac{S}{S+M+P}$$

ranges from about 23/100 to 28/100.

References Cited in the file of this patent

UNITED STATES PATENTS

| | | |
|---|---|---|
| 1,986,854 | Reid | Jan. 8, 1935 |
| 2,339,056 | Craver | Jan. 11, 1944 |
| 2,380,925 | Cheyney | Aug. 7, 1945 |
| 2,863,845 | Magne et al. | Dec. 9, 1958 |